(12) United States Patent
Ikeda

(10) Patent No.: US 10,846,536 B2
(45) Date of Patent: Nov. 24, 2020

(54) ABNORMALITY DETECTION DEVICE AND ABNORMALITY DETECTION METHOD

(71) Applicant: NEC Corporation, Tokyo (JP)

(72) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 165 days.

(21) Appl. No.: 15/321,640

(22) PCT Filed: May 25, 2015

(86) PCT No.: PCT/JP2015/064866
§ 371 (c)(1),
(2) Date: Dec. 22, 2016

(87) PCT Pub. No.: WO2015/198767
PCT Pub. Date: Dec. 30, 2015

(65) Prior Publication Data
US 2017/0220871 A1    Aug. 3, 2017

(30) Foreign Application Priority Data
Jun. 27, 2014   (JP) .................................. 2014-132304

(51) Int. Cl.
  *G06K 9/00*  (2006.01)
  *G08B 25/00* (2006.01)
  (Continued)

(52) U.S. Cl.
  CPC ..... *G06K 9/00771* (2013.01); *G06K 9/00342* (2013.01); *G08B 13/196* (2013.01); *G08B 13/19613* (2013.01); *G08B 25/00* (2013.01); *H04N 5/23219* (2013.01); *H04N 5/23222* (2013.01); *H04N 5/23296* (2013.01); *H04N 7/18* (2013.01)

(58) Field of Classification Search
  CPC ...................... G06K 9/00771; G08B 13/19613
  See application file for complete search history.

(56) References Cited

U.S. PATENT DOCUMENTS 6,147,601 A    11/2000  Sandelman et al.
6,678,413 B1 *  1/2004  Liang .................... A61B 5/1113
                                                382/181
(Continued)

FOREIGN PATENT DOCUMENTS

JP   10-285586   10/1998
JP   2007-6427    1/2007
(Continued)

OTHER PUBLICATIONS

Oshima, N. et al, English Translation of JP2012208850 (Year: 2012).*

(Continued)

*Primary Examiner* — Gandhi Thirugnanam
(74) *Attorney, Agent, or Firm* — Finnegan, Henderson, Farabow, Garrett & Dunner, L.L.P.

(57) ABSTRACT

An image processing device (100) includes a change detection unit (101) that detects a target state change in a person on the basis of an input image, and a determination unit (102) that determines an abnormal state in accordance with a detection obtained by detecting occurrences of the target state change in a plurality of persons.

20 Claims, 15 Drawing Sheets

(51) Int. Cl.
  *H04N 7/18* (2006.01)
  *G08B 13/196* (2006.01)
  *H04N 5/232* (2006.01)

(56) References Cited

U.S. PATENT DOCUMENTS

| | | | |
|---|---|---|---|
| 7,433,493 B1* | 10/2008 | Miyoshi | G06K 9/00771 |
| | | | 348/E7.087 |
| 9,615,066 B1 | 4/2017 | Tran et al. | |
| 10,043,360 B1* | 8/2018 | Mullins | G08B 13/19615 |
| 10,186,124 B1* | 1/2019 | Mullins | G08B 25/14 |
| 2006/0190419 A1* | 8/2006 | Bunn | G06N 20/00 |
| | | | 706/2 |
| 2007/0025722 A1 | 2/2007 | Matsugu et al. | |
| 2008/0123975 A1* | 5/2008 | Otsu | G06K 9/00342 |
| | | | 382/236 |
| 2009/0010490 A1* | 1/2009 | Wang | G06T 7/292 |
| | | | 382/103 |
| 2010/0177963 A1* | 7/2010 | Yokomitsu | B61L 23/00 |
| | | | 382/170 |
| 2013/0113934 A1 | 5/2013 | Hotta et al. | |
| 2014/0098996 A1* | 4/2014 | Fujimatsu | G06K 9/3241 |
| | | | 382/103 |
| 2014/0362213 A1 | 12/2014 | Tseng | |
| 2015/0010204 A1 | 1/2015 | Iwai | |
| 2015/0139504 A1* | 5/2015 | Kurosawa | G08B 21/0415 |
| | | | 382/107 |
| 2017/0220871 A1* | 8/2017 | Ikeda | G08B 25/00 |
| 2020/0211343 A1* | 7/2020 | Mullins | G08B 13/19682 |

FOREIGN PATENT DOCUMENTS

| | | | | |
|---|---|---|---|---|
| JP | 2007-243342 | | 9/2007 | |
| JP | 2007243342 A | * | 9/2007 | |
| JP | 2007-264950 A | | 10/2007 | |
| JP | 2010-128594 | | 6/2010 | |
| JP | 2010128594 A | * | 6/2010 | |
| JP | 2012-14302 A | | 1/2012 | |
| JP | 2012-208850 | | 10/2012 | |
| JP | 2012208850 A | * | 10/2012 | |
| JP | 2012-253723 A | | 12/2012 | |
| JP | 2013-131153 A | | 7/2013 | |
| KR | 10-1179276 | | 9/2012 | |
| KR | 10-2013-0103213 | | 9/2013 | |
| WO | WO 02/21441 A1 | | 3/2002 | |
| WO | WO-2014021005 A1 | * | 2/2014 | G06K 9/00677 |
| WO | WO-2015198767 A1 | * | 12/2015 | G08B 25/00 |

OTHER PUBLICATIONS

Oshima, N. et al, English Translation of JP2012208850 (Google Patents) (Year: 2012).*
International Search Report and Written Opinion dated Jul. 7, 2015, in corresponding PCT International Application.
Office Action dated Jun. 25, 2019, issued by the Japanese Patent Office in counterpart Japanese Patent Application No. JP 2016-529191.
Office Action dated Oct. 24, 2019, issued by The Japanese Patent Office in counterpart Japanese Patent Application No. JP 2016-529191.
U.S. Office Action dated Jan. 2, 2020, issued in co-pending U.S. Appl. No. 16/298,698.
Office Action dated May 28, 2020 issued by the U.S. Patent and Trademark Office in co-pending U.S. Appl. No. 16/298,698.

* cited by examiner

FIG. 3

| OCCURRENCE TIME | PERSON ID | STATE CHANGE |
|---|---|---|
| T0 | H0 | COVERING HEAD WITH HAND OR ARM |
| T1 | H1 | CROUCHING DOWN |
| T1 | H2 | CROUCHING DOWN |
| T1 | H3 | CROUCHING DOWN |
| T1 | H4 | COVERING HEAD WITH HAND OR ARM |
| ⋮ | ⋮ | ⋮ |

FIG. 4

| OCCURRENCE TIME | PERSON ID | STATE CHANGE | POSITION |
|---|---|---|---|
| T0 | H0 | COVERING HEAD WITH HAND OR ARM | (x00, y00) |
| T1 | H1 | CROUCHING DOWN | (x01, y01) |
| T1 | H2 | CROUCHING DOWN | (x02, y02) |
| T1 | H3 | CROUCHING DOWN | (x03, y03) |
| T1 | H4 | COVERING HEAD WITH HAND OR ARM | (x04, y04) |
| ⋮ | ⋮ | ⋮ | ⋮ |

ABNORMALITY DETECTION DEVICE AND ABNORMALITY DETECTION METHOD

CROSS-REFERENCE TO RELATED PATENT APPLICATIONS

This application is a National Stage Entry of International Application No. PCT/JP2015/064866, filed May 25, 2015, which claims priority from Japanese Patent Application No. 2014-132304, filed Jun. 27, 2014. The entire contents of the above-referenced applications are expressly incorporated herein by reference.

TECHNICAL FIELD

The present invention relates to a technique for detecting abnormality using an image.

BACKGROUND ART

For the purpose of crime prevention, disaster prevention, abnormality detection, and the like, there are systems that detect abnormal states of persons, objects, places or the like using a monitoring image. For example, Patent Document 1 proposes a monitoring image display system capable of ascertaining the presence or absence of neglected objects or lost objects. Specifically, this system extracts a region of an image which is different from a reference image of a predetermined region and of which the position does not temporally change, from an image obtained by capturing an image of the predetermined region in a time-series manner.

Patent Document 2 proposes a video monitoring device that automatically detects a suspicious person having a specific intention among persons appearing in an image. Such a device extracts information indicating persons' interests or psychological states from the persons' eye-direction information, and searches for a person who is in a specific psychological state, using the extracted information. Specifically, this device detects a person from a captured image, extracts eye-direction information of the person, calculates a gaze feature amount (specific direction total gaze time, the number of times of eye transition, or the like) from eye-direction information for each person, and acquires information relating to the behavior of a person of which the image is captured, from this gaze feature amount.

RELATED DOCUMENTS

Patent Documents

[Patent Document 1] Japanese Unexamined Patent Application Publication No. H10-285586
[Patent Document 2] Japanese Unexamined Patent Application Publication No. 2007-6427

SUMMARY OF THE INVENTION

Technical Problem

Currently, as in the respective aforementioned propositions, a different system having a specific algorithm is present for each individual abnormal state to be detected. The system of Patent Document 1 detects the presence of neglected objects which are normally not present in the captured image, as an abnormal state of a place. The device of Patent Document 2 detects a person who is in a specific psychological state in the captured image, as an abnormal state of the person.

However, various abnormal states may occur in a monitoring place. For example, in a case where a park is considered as a monitoring place, various abnormal states can occur in a park, like the presence of neglected objects, foul matter, suspicious persons or the like, the breakage of playground equipment, the occurrence of an accident, and the like. In each of the proposed methods described above, such multiple types of abnormal state are not able to be comprehensively detected.

The present invention is contrived in view of such circumstances, and an object thereof is to provide a technique for comprehensively detect various abnormal states. In the present specification, abnormal states to be detected are not restricted.

Solution to Problem

In each aspect of the present invention, each of the following configurations is adopted in order to solve the above-mentioned problems.

A first aspect relates to an image processing device. According to the first aspect, there is provided an image processing device including: a change detection unit that detects a target state change in a person on the basis of an input image; and a determination unit that determines an abnormal state in accordance with a detection obtained by detecting occurrences of the target state change in a plurality of persons.

A second aspect relates to an abnormality detection method which is executed by at least one computer. According to the second aspect, there is provided an abnormality detection method including: detecting a target state change in a person on the basis of an input image; determining an abnormal state in accordance with a detection obtained by detecting occurrences of the target state change in a plurality of persons.

Meanwhile, in another aspect of the present invention, there may be provided a program causing at least one computer to execute the method according to the second aspect, and a computer readable recording medium having such a program recorded thereon. This recording medium includes a non-transitory tangible medium.

Advantageous Effects of Invention

According to each of the aspects, it is possible to provide a technique for comprehensively detecting various abnormal states.

BRIEF DESCRIPTION OF THE DRAWINGS

The above and other objects, features and advantages will be made clearer from certain preferred exemplary embodiments described below, and the following accompanying drawings.

FIG. 3 is a diagram illustrating an example of state change information which is stored in a storage unit.

FIG. 4 is a diagram illustrating another example of the state change information which is stored in the storage unit.

DESCRIPTION OF EXEMPLARY EMBODIMENTS

Hereinafter, exemplary embodiments of the present invention will be described. Meanwhile, the following respective exemplary embodiments are illustrative, and the present invention is not limited to the configurations of the following exemplary embodiments.

First Exemplary Embodiment

[Device Configuration]

Figure 1:
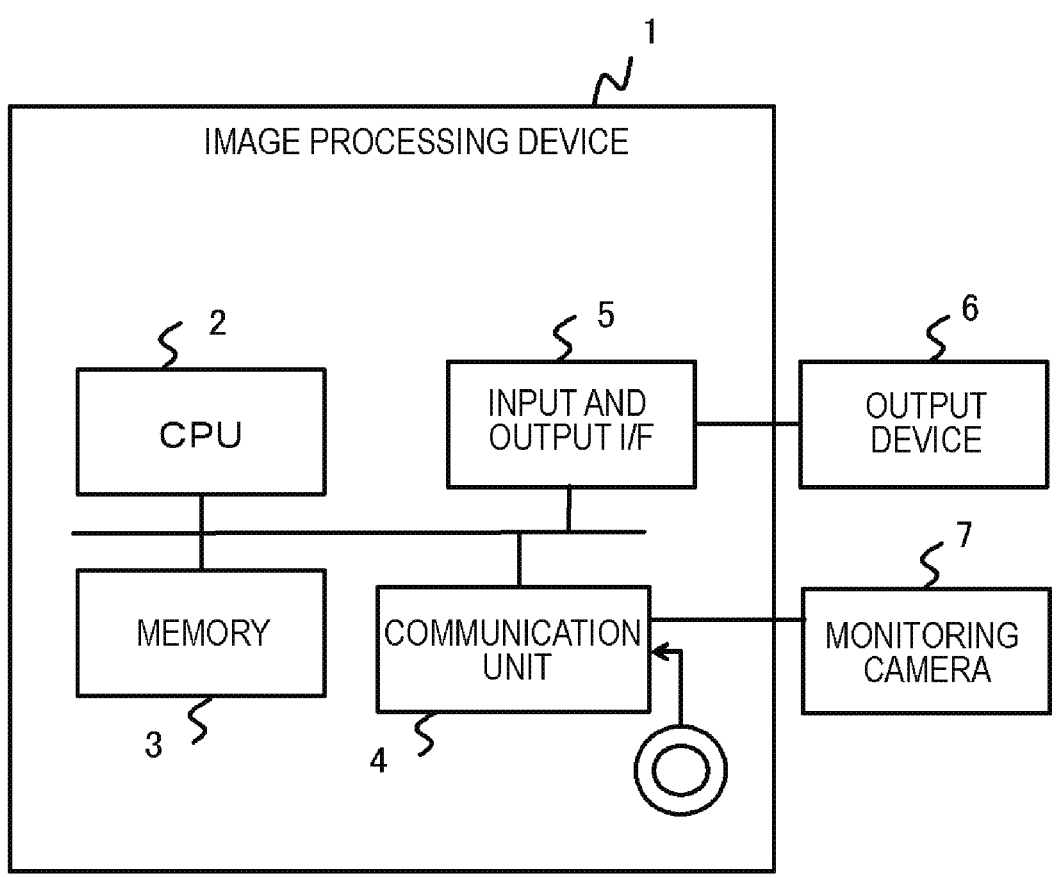
FIG. 1 is a diagram conceptually illustrating a hardware configuration example of an image processing device in a first exemplary embodiment.

FIG. 1 is a diagram conceptually illustrating a hardware configuration example of an image processing device (which may be hereinafter simply denoted by a processing device) 1 in a first exemplary embodiment. The processing device 1 is a so-called computer, and includes, for example, a central processing unit (CPU) 2, a memory 3, a communication unit 4, an input and output interface (I/F) 5, and the like which are connected to each other through a bus. The memory 3 is a random access memory (RAM), a read only memory (ROM), a hard disk, or the like. The communication unit 4 exchanges signals with other computers or devices. In the first exemplary embodiment, the communication unit 4 is connected to a monitoring camera 7. The communication unit 4 acquires a video signal from the monitoring camera 7. In addition, the communication unit 4 may also be connected to a portable recording medium or the like.

The monitoring camera 7 is installed at a position and in a direction where an image of any monitored place can be captured, and sends a captured video signal to the communication unit 4. Hereinafter, the place of which the image is captured by the monitoring camera 7 may be denoted by a monitored place. In FIG. 1, one monitoring camera 7 is shown, but a plurality of monitoring cameras may be connected to the communication unit 4.

The input and output I/F 5 is connectable to a user interface device such as an output device 6. The output device 6 is any one of a display device, a printing device, a projection device and the like, or any plurality thereof. The display device is a device, such as a liquid crystal display (LCD) or a cathode ray tube (CRT) display, which displays a screen corresponding to drawing data processed by the CPU 2 or a graphics processing unit (GPU) (not shown). The input and output I/F 5 may be connected to an input device (not shown), such as a keyboard or a mouse, which receives a user's operation input. In addition, the input and output I/F 5 may be connected to a touch panel integrated with the output device 6 and the input device. The hardware configuration of the processing device 1 is not restricted.

[Process Configuration]

Figure 2:
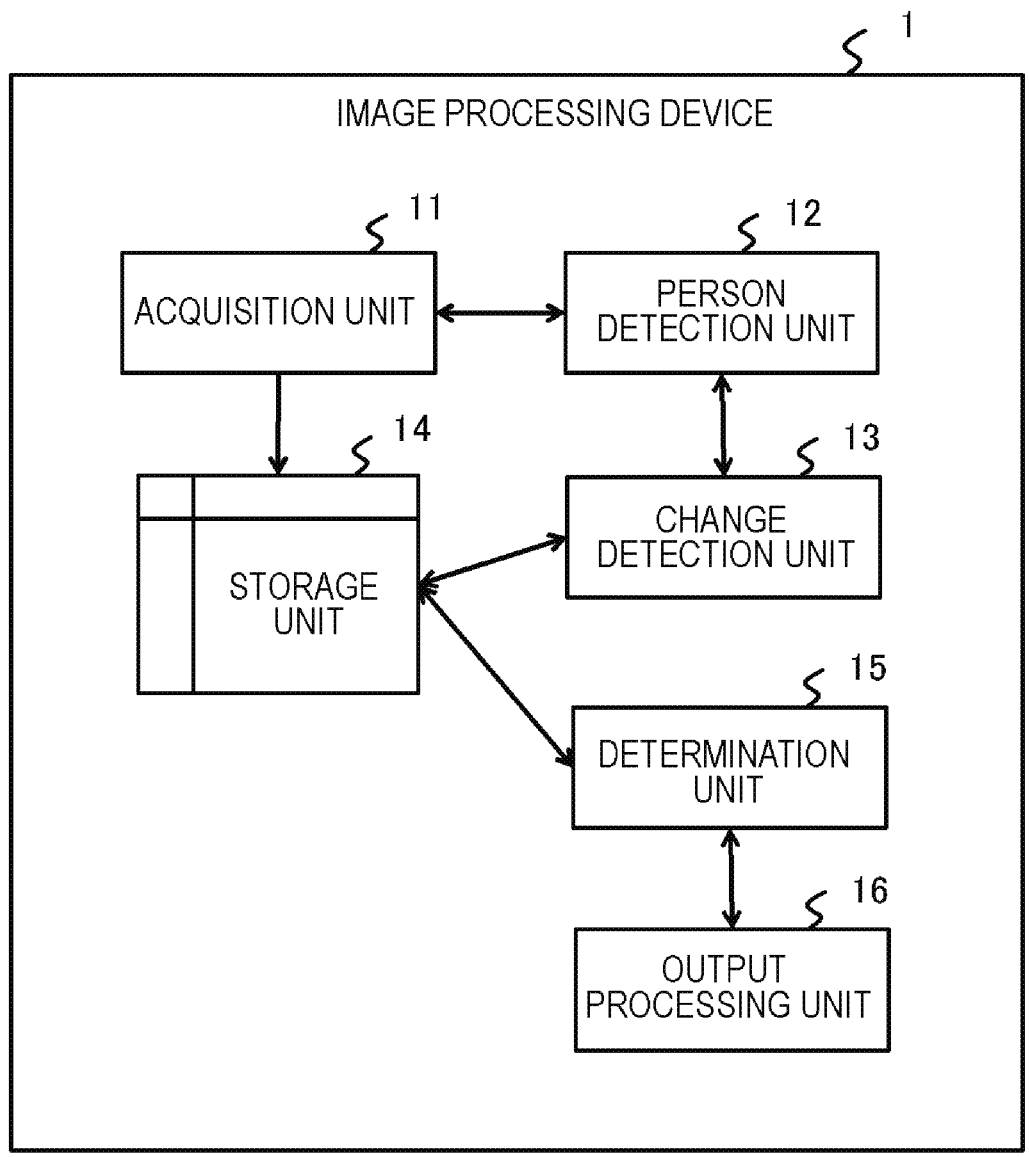
FIG. 2 is a diagram conceptually illustrating a process configuration example of the image processing device in the first exemplary embodiment.

FIG. 2 is a diagram conceptually illustrating a process configuration example of the image processing device 1 in the first exemplary embodiment. As shown in FIG. 2, the processing device 1 includes an acquisition unit 11, a person detection unit 12, a change detection unit 13, a storage unit 14, a determination unit 15, an output processing unit 16, and the like. Each of these processing units is implemented by, for example, a program stored in the memory 3 being executed by the CPU 2. In addition, the program is installed from a portable recording medium such as, for example, a compact disc (CD) or a memory card, or other computers on a network through the communication unit 4 or the input and output I/F 5, and may be stored in the memory 3.

The acquisition unit 11 acquires an input image. Specifically, the acquisition unit 11 sequentially acquires the input image by capturing a video signal from the monitoring camera 7 at an arbitrary timing. The arbitrary timing is, for example, a predetermined cycle. The input image acquired by the acquisition unit 11 is stored in the storage unit 14.

The person detection unit 12 detects a person from the input image acquired by the acquisition unit 11. The person detection unit 12 may detect a person's entire body, or may detect a portion of the person such as the head, the face, or the upper half of the body. The range of detection of a person by the person detection unit 12 depends on the contents of detection of a state change by the change detection unit 13 described later. Such a dependency relation will be described later.

The person detection unit 12 detects a person using a well-known image recognition method. For example, the person detection unit 12 stores the feature amount of an image corresponding to the range of detection of a person, and detects a region similar to the feature amount in the input image as the detection range. A method of detection by the person detection unit 12 is not restricted.

The change detection unit 13 detects a target state change in a person detected by the person detection unit 12, on the basis of a plurality of input images which are sequentially acquired by the acquisition unit 11. For example, the change detection unit 13 detects that the outer appearance of a person detected by the person detection unit 12 changes into the target state while tracking the person between a plurality of input images. As the method of tracking a person between a plurality of images, a well-known method of tracking an object and a person may be used. For example, the change detection unit 13 compares the feature amounts of respective person regions detected in the respective images, and recognizes approximate person regions as the same person. The method of tracking a person by the change detection unit 13 is not restricted.

In addition, the change detection unit 13 previously may stores a changed state of the target state change, and detect a target state change, as follows, using this stored changed state. Here, the changed state is previously stored as, for example, an image feature amount. The change detection unit 13 determines whether the state of a person detected by the person detection unit 12 in the input image is the stored state. In a case where the stored state is detected in the input image, the change detection unit 13 determines whether the state of the person changes using an input image captured prior in time to the above input image. In order to detect all state changes, the change detection unit 13 may, in a case where a change is detected in tracking a person between the input images, determines whether a changed state is a previously stored state. However, a method of detecting a state change by the change detection unit 13 is not restricted to such a method. A target state change may also be detected without performing tracking between a plurality of images. For example, in order to detect a jump, the change detection unit 13 may detect a state where the feet are lifted off the ground or the floor in one input image. In addition, in a case where a change into a state such as frowning, shutting eyes, or sitting down which a person present in a monitored place does not normally perform is set to a target state change, the state change may be detected from one input image.

A state change of a person appearing in an input image may occur due to various factors. For example, even when a person is just walking, since his or her feet move, the posture (state) of the person changes between images. In addition, in a case where a person is looking at a smartphone while walking, a change in posture due to walking and a change in posture such as looking at the smartphone occurs. The change detection unit 13 detects a change in outer appearance of a person, caused by the occurrence of an abnormal state in every such state change, as the target state change.

Examples of the target state changes include a change in posture, a change in motion, a change in outer appearance expressed by emotion, and the like. Examples of the target state changes may include crouching down, looking back, looking up, covering the head with a armor a hand, pointing with a finger, taking a picture, running away, tumbling down, falling down, jumping, standing up, frowning, shutting the eyes, looking surprised, and the like. Insofar as the target state change is a change in outer appearance of a person and is a change due to the occurrence of an abnormal state, the specific change contents are not restricted.

However, detectable state changes may be restricted in accordance with the installation position of the monitoring camera 7 that captures an input image, the number of pixels (image resolution) of the monitoring camera 7, or the like. For example, since a change in expression of a face or a portion of a face (such as an eye) is indicated as a change in a tiny image region, there is the possibility of the change not being able to be detected. In such a case, the change detection unit 13 may detect a change in a large portion of the body or the outer appearance of the entire body like a head, a trunk, arms and legs, as a target state change. Even in a case where the change in the entire body or the outer appearance of a large portion of the body is set to a target state change, crouching down, tumbling down, running away, finger pointing, and the like can be detected, an abnormal state can be determined.

The range of detection of a person by the person detection unit 12 is determined in advance in accordance with a target state change to be detected by the change detection unit 13. For example, in order to detect a state change such as looking back, looking up, or covering the head with an arm or a hand, the person detection unit 12 may detect the head or the upper half of the body. In order to detect a state change such as frowning, shutting eyes, blushing, or blanching, the person detection unit 12 may detect a face. In order to detect a state change such as crouching down, tumbling down, or jumping, it is preferable that the person detection unit 12 detects the entire image of a person.

Here, a relationship between a state change and an abnormal state is exemplified. For example, in a case where the abnormal state of a person such as a suspicious state of the person occurs, people around the person have a high possibility of making a state change such as looking back, pointing with a finger, running away, frowning, or looking surprised. In addition, in a case where the abnormal state of an object such as a neglected object or foul matter occurs, people around the object have a high possibility of making a state change such as jumping, looking back, frowning, or nose pinching. In addition, in a case where the abnormal state of a place such as a fire or the like occurs, people around the place have a high possibility of making a state change such as running away, cellular phone operation, pointing with a finger, taking a picture, looking back, or hand waving. Consequently, a target state change to be detected by the change detection unit 13 may be determined in accordance with an abnormal state which is a target of determination by the determination unit 15 described later.

The storage unit 14 stores each input image acquired by the acquisition unit 11, and further stores information for each target state change (state change information) detected by the change detection unit 13.

FIG. 3 is a diagram illustrating an example of state change information which is stored in the storage unit 14. As shown in FIG. 3, the state change information includes information such as an occurrence time, a person ID, the details of a state change, and the like. The acquisition time of an input image at which a changed state is detected or the identification number of the input image is set in the occurrence time. The person ID is identification data which is given to a new person whenever the person is detected by the person detection unit 12.

FIG. 4 is a diagram illustrating another example of the state change information which is stored in the storage unit 14. As shown in FIG. 4, the position of a person corresponding to a person ID on an image may be set in the state change information. Such a position is specified by, for example, the person detection unit 12, and is set in the state change information which is stored in the storage unit 14. This position is decided by the representative position of a person which is detected by the person detection unit 12, as in the central position of the head, the central position of the chest, or the like. In addition, in a case where camera parameters indicating the position, attitude, a focal length and the like of the monitoring camera 7 are stored, the camera parameters may be used to obtain the three-dimensional position (position of a real space) of a person from the position of the person on the image shown above, and the position thereof may be additionally set. In addition, in a case where the position of a person is handled in a process described later, the three-dimensional position of the person may be used.

The determination unit 15 detects occurrences of a target state change in a plurality of persons, and determines an abnormal state in accordance with this detection. Specifically, the determination unit 15 monitors the state change information which is stored in the storage unit 14 at all times, and detects occurrences of a target state change in equal to or more than a predetermined number of persons, on the basis of the state change information. The predetermined number of persons is stored in advance by the determination unit 15. The predetermined number of persons may be two or more, and is determined in accordance with the number of persons which can appear in an input image to be acquired. However, as the predetermined number of persons becomes larger, the accuracy of determination of the abnormal state is improved. The reason for the occurrences of a target state change, as described above, in many people is because there is a high possibility of some kind of abnormal state occurring.

In a case where it is detected occurrences of a target state change in a plurality of persons, the determination unit 15 determines some kind of abnormal state to be present or occur. The number of kinds of target state change which is a basis of the determination for an abnormal state may be one or plural. For example, the determination unit 15 may tally up the number of persons of which the state change has occurred with respect to each of multiple types of state change of a target such as crouching down, tumbling down, and covering the head with a arm or a hand, and determine the abnormal state to be present or occurring when the total number of persons is equal to or more than a predetermined number of persons. In addition, in a case where any of the tallied up numbers of persons for each target state change is equal to or more than the predetermined number of persons, the determination unit 15 may determine the abnormal state to be present or occurring.

«Other Methods for Determining Abnormal States: Method 1»

The determination unit 15 may also further use a deviation in the occurrence times of a target state change in a plurality of persons in order to determine an abnormal state. In this case, when occurrences of the target state change in equal to or more than a predetermined number of persons is detected, the determination unit 15 calculates time widths of a set of the occurrence times of the state change. The determination unit 15 determines whether the time width is within a predetermined time width. That is, the determination unit 15 detects the occurrences of the target state change in a plurality of persons within a predetermined time period, and determines an abnormal state in accordance with this detection result. The smaller a deviation in the occurrence times of a target state change in a plurality of persons is, the higher a possibility of some kind of abnormal state occurring. There is a high possibility that the occurrences of a target state change in a plurality of persons at substantially the same timing is caused by the occurrence of an abnormal state. In this manner, an abnormal state is determined by further providing the condition of "within a predetermined time period", and thus it is possible to improve the accuracy of determination of an abnormal state.

The predetermined time period is stored in advance by the determination unit 15. The predetermined time period may also be indicated using the number of input images. For example, the number of input images may be converted into a time period in accordance with a cycle of obtaining an input image from a video signal which is sent from the monitoring camera 7. In a case where an input image is captured from a video signal in a cycle of 0.5 seconds, ten input images are equivalent to 5 seconds. Thus, in a case where the identification number of an input image is included in the state change information stored in the storage unit 14, as described above, as an occurrence time, the predetermined number of input images is used as a predetermined time period.

Further, the determination unit 15 may also infer the degree of an abnormal state in accordance with a deviation in the occurrence times of a target state change in a plurality of persons. The inferred degree of an abnormal state is the extent of an abnormal state, the magnitude of the degree of abnormality, the magnitude of the degree of danger associated with an abnormal state, or the like. In a case where the deviation is small, the determination unit 15 may determine the degree of an abnormal state to be high. In a case where the degree of an abnormal state is high, the reaction speeds of the surrounding persons with respect to the abnormal state become faster. For example, in a case where a dangerous person intrudes into a monitored place, a person having noticed the dangerous person reacts immediately greatly, and the reaction is rapidly propagated to surrounding people depending on the magnitude of the reaction. On the other hand, in a case where a small amount of foul matter is present in a monitored place, the reaction of surrounding people associated with the foul matter is weak, and as a result, the reaction speed becomes slower. Thus, in a case where the deviation is high, the determination unit 15 may infer that the degree of an abnormal state is small, and that the abnormal state has been continued for a while.

«Other Methods for Determining Abnormal States: Method 2»

The determination unit 15 may detect the changed states which have occurred in a plurality of persons to be the same target state change, and determine an abnormal state in accordance with this detection. In this case, the determination unit 15 counts the number of persons having the same details of a state change, in the state change information stored in the storage unit 14, and determines an abnormal state to be present in a case where the counted number of persons in any state change is equal to or more a predetermined number of persons. In a case where a plurality of persons have made the same state change, there is a high possibility of some kind of abnormal state occurring. Thus, in this manner, the condition of "resulting in the same changed state" is further added to the determination of an abnormal state, and thus it is possible to increase the accuracy of determination of an abnormal state.

«Other Methods for Determining Abnormal States: Method 3»

The determination unit 15 may detect occurrences of a target state change in a plurality of persons close in distance to each other, and determine an abnormal state in accordance with this detection. In this case, the determination unit 15 calculates a relative distance from each other (distance within an image) between each of persons having made a target state change, using position information of the state change information stored in the storage unit 14. The determination unit 15 counts the number of persons in which the calculated relative distance is within a predetermined distance, and determines an abnormal state to be present in a case where the number of persons is equal to or more than a predetermined number of persons. In a case where the plurality of persons close in distance to each other make a target state change, there is a high possibility of some kind of abnormal state occurring. Thus, in this manner, the condition of "a relative distance between each of persons having made a target state change is short" is further added to the determination of an abnormal state, and thus it is possible to increase the accuracy of determination of an abnormal state.

As described above, there are a plurality of methods of determining an abnormal state. Each of the methods may be appropriately selected in accordance with the type of abnormal state to be detected. For example, in a case where as many types of abnormal state as possible are desired to be detected, the determination unit 15 determines an abnormal state to be present, with a target state change occurring in equal to or more than a predetermined number of persons. In a case where the accuracy of determination is desired to be further increased, the determination unit 15 may execute each of Methods 1, 2, and 3 of «Other Methods for Determining Abnormal States», and determine an abnormal state in accordance with each determination result. In addition, in a case where a further improved accuracy in determination is desired to be further improved, the determination unit 15 may determine an abnormal state to be present only in a case where all the conditions described above are satisfied, that is, a case where persons of equal to or more than a predetermined number close in distance to each other make states changed within a predetermined time period, each of the changed states being the same as a target state change. However, each of the conditions used in each of the methods may be used by an appropriate combination thereof.

The output processing unit 16 may cause the output device 6 to output the presence of an abnormal state indicated by the result of determination by the determination unit 15. For example, the output processing unit 16 sends a video signal from the monitoring camera 7 to the output device 6, and causes the output device 6 to display video captured by the monitoring camera 7 at all times. In a case where it is determined by the determination unit 15 that an abnormal state is present, the output processing unit 16 superimpose a drawing element indicating the presence of an abnormal state on display video and display the superimposed display video. The output processing unit 16 may output an image imaged before the abnormal state is determined, together with in juxtaposition an image indicating the presence of an abnormal state. In addition, the output processing unit 16 may also output the presence of an abnormal state, using a separate output device (such as a light emitting diode (LED)) from the output device 6 that displays display video. For example, the presence of an abnormal state may also be output by turning on an LED, changing the lighting color of an LED, or the like. However, an output form thereof is not restricted to display or lighting, and may be, for example, printing, generating a data file, or the like. The output form is not restricted.

The output processing unit 16 may also cause the output device 6 to output the following contents, in addition to the presence/absence of an abnormal state or instead of the presence/absence of an abnormal state. In each of the following output examples, the drawing element (including information of the number of persons, order information, coloration, or the like) may be attached by editing an input image stored in the storage unit 14, and may be attached being superimposed on video based on a video signal from the monitoring camera 7.

Output Example 1

The output processing unit 16 causes the output device 6 to output an image in which a drawing element is attached to a person group or to each person of the person group in the input image, the detected state change of the person group or each person of the person group being a basis of the determination for an abnormal state. A position to which the drawing element is attached is decided by, for example, position information of the state change information stored in the storage unit 14. Hereinafter, the person group of which the detected state change is a basis for the determination of an abnormal state may be denoted by a "person group as the basis". The output processing unit 16 causes the output device 6 to output an image, obtained by attaching the drawing element to the input image stored in the storage unit 14. The drawing element is, for example, a line surrounding a person group as the basis, or some kind of mark (such as a point, a star, an exclamation mark, an arrow, or a balloon) which is attached to the person group or each person of the person group. As long as the drawing element is attached so that the person group as the basis or each person thereof can be specified, the drawing element itself, a position of the attached drawing element, and the method of attaching the drawing element are not restricted.

Figure 5:
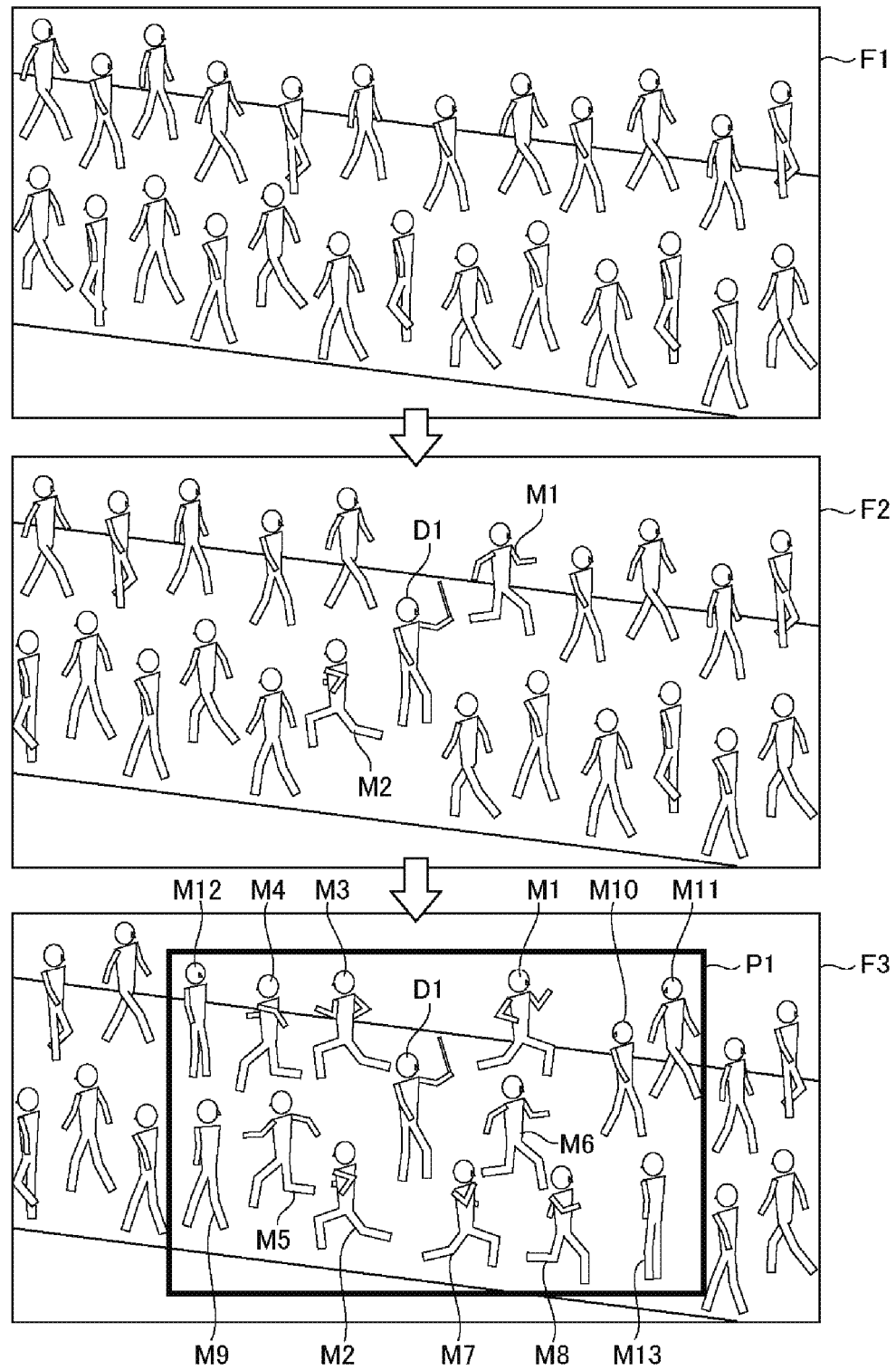
FIG. 5 is a diagram illustrating a first example of output images of an output device.

FIG. 5 is a diagram illustrating a first example of output images of the output device 6. FIG. 5 shows a status in which a dangerous person D1 appears in a monitored place captured by the monitoring camera 7, and the abnormal state of a person (also considered to be the abnormal state of a place) is detected by the processing device 1. At a capturing timing of an output image F1, an abnormal state is not present, and a plurality of passersby come and go. At a capturing timing of an output image F2, the dangerous person D1 appears in the monitored place and two passersby M1 and M2 closest to the dangerous person perform escape behavior. In the example of FIG. 5, the processing device 1 having acquired this output image F2 as an input image does not determine an abnormal state to be present.

At a capturing timing of an output image F3, passersby M3 to M13 take notice of the dangerous person D1 in addition to the passersby M1 and M2, and make a target state change. Specifically, passersby M1 to M8 change from a walking state to a running away state, passersby M9 to M11 change from a walking state to a looking back state, and passersby M12 and M13 change from a walking state to a stop state. Other passersby calmly perform normal walking. In this case, the determination unit 15 detects thirteen persons who make target state changes such as running away, looking back, or stopping, in the input image, and determines an abnormal state to be present in accordance with this detection. That is, in the example of FIG. 5, the determination unit 15 stores "3" as a predetermined number of persons, and determines an abnormal state to be present in a case where a target state change occurs in equal to or more than three persons. The output processing unit 16 causes the output device 6 to output an image attached with a square-shaped drawing element P1 attached to the person group including passersby M1 to M13 being a basis of the determination for an abnormal state, the drawing element surrounding the person group. In the example of FIG. 5, since an abnormal state (dangerous person D1) is present within the drawing element P1, a person who has seen the output image can immediately ascertain the position of the abnormal state and the details thereof.

Figure 6:
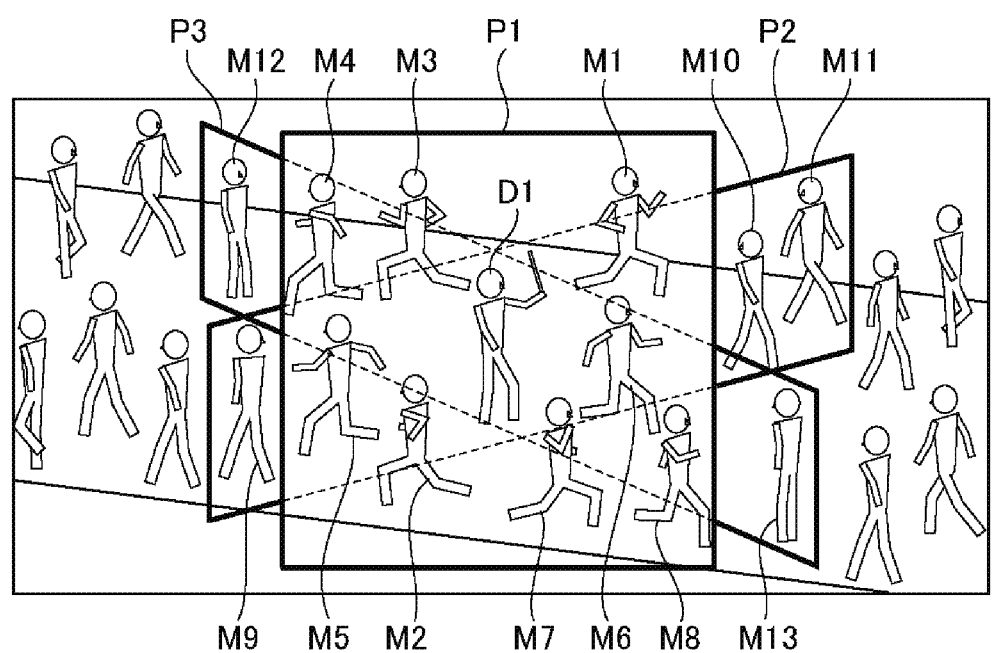
FIG. 6 is a diagram illustrating a second example of the output image of the output device.

FIG. 6 is a diagram illustrating a second example of an output image of the output device 6. In the example of FIG. 6, the determination unit 15 determines an abnormal state using Method 2 of «Other Methods for Determining Abnormal States» described above. Specifically, the determination unit 15 counts the number of persons who make a target state change resulting in the same changed state. The number of persons who have made a target state change of "running away" is counted as "eight" (passersby M1 to M8), the number of persons who have made a target state change of "looking back" is counted as "three" (passersby M9 to M11), and the number of persons who have made a target state change of "stopping" is counted as "two" (passersby M12 and M13). Since the state changes of targets of "running away" and "looking back" occur in equal to or more than a predetermined number of persons of "three", the determination unit 15 determines an abnormal state to be present. In this case, as shown in FIG. 6, the output processing unit 16 outputs an image in which a square-shaped drawing element is attached to each person group having the same changed state. The drawing element P1 surrounds a person group in which a changed state is "running away", a drawing element P2 surrounds a person group in which a changed state is "looking back", and a drawing element P3 surrounds a person group in which a changed state is "stopping". Meanwhile, in FIG. 6, in order to make the drawing easier to understand, portions in which the respective drawing elements overlap each other are shown by dotted lines.

In this manner, an image having a drawing element attached to a person group as the basis or each person of the person group is output, and thus a person who sees the image can easily infer a place in which an abnormal state is present. This is because there is a high possibility of an abnormal state being present in the periphery of a position in which a person group as the basis or each person of the person group is present.

Output Example 2

The output processing unit 16 may also cause the output device 6 to output an image in which any one or both of the number of persons in the person group and a relative distance between each person of the person group are further attached to the person group in the input image, the detected state change of the person group being a basis for a determination of an abnormal state. The number of persons and the relative distance are attached to a position capable of specifying a target person group. Here, the number of persons in a person group as the basis and the relative distance between each person of the person group are considered to indicate the accuracy of determination of an abnormal state. This is because in a case where the number of persons who have made the target state change is large, and a case where the distance between each person who has made the target state change is short, there is a high possibility of an abnormal state being present. Thus, with such an output image, a person who sees the image can easily infer the accuracy of determination of an abnormal state.

In addition, the number of persons in the person group as the basis is further considered to indicate the degree of an abnormal state. In a case where the number of persons who have made the target state change is large, there is the possibility of the degree of an abnormal state being high. Thus, according to the output image having the number of persons attached therein, a person who sees the image can also infer the degree of an abnormal state.

Figure 7:
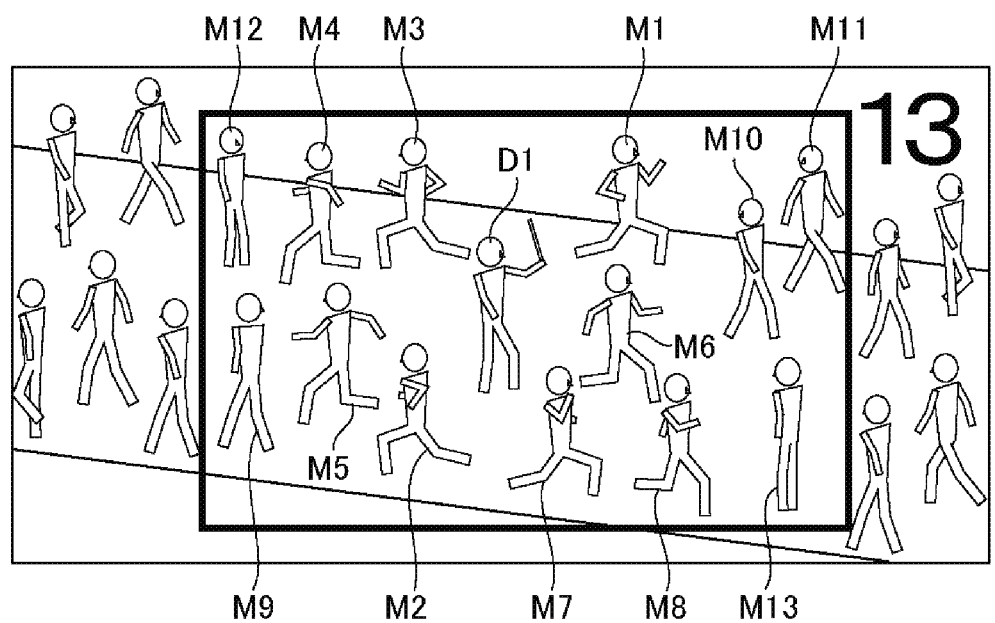
FIG. 7 is a diagram illustrating a third example of the output image of the output device.

FIG. 7 is a diagram illustrating a third example of an output image of the output device 6. In the example of FIG. 7, the output processing unit 16 causes the output device 6 to output an image in which "13" as the number of persons is attached to a person group as the basis together with a square-shaped drawing element.

Output Example 3

The output processing unit 16 may also cause the output device 6 to output an image in which the order of state changes or the time difference between state changes is attached to each person of a person group of which the detected state change is a basis of the determination for an abnormal state, as the drawing element or together with the drawing element described above. As a time of a state change of each person, a time is used which corresponds to that of each input image in which the state change is detected. Here, the time difference between state changes refers to a time difference between a time at which an earliest state change has occurred to a time at which a state change made in each person. For example, "±0" is attached to the periphery of a person who has made the earliest state change, and "+5 seconds" and "+8 seconds" are respectively attached to other persons in the periphery, indicating time differences from the earliest change to the time of state changes made in the other person. A state change associated with an abnormal state is more likely to be made from a person close to the abnormal state. Thus, an image in which the order of state changes or the time difference between state changes is attached is output, and thus a person who has seen the image can easily infer a place in which an abnormal state is present.

Figure 8:
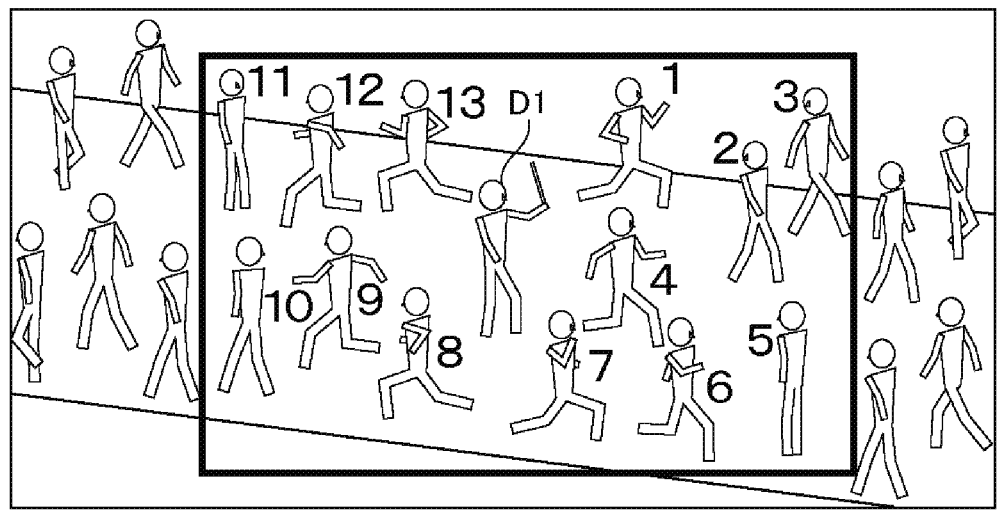
FIG. 8 is a diagram illustrating a fourth example of the output image of the output device.

FIG. 8 is a diagram illustrating a fourth example of an output image of the output device 6. In the example of FIG. 8, the output processing unit 16 causes the output device 6 to output an image in which a square-shaped drawing element is attached to a person group as the basis, and the order of state changes is attached to each person of the person group. In the example of FIG. 8, a different order is attached to each person, but the same order may be attached to each of persons in which a target state change is detected in the same input image.

Output Example 4

The output processing unit 16 may also cause the output device 6 to output an image attached with a drawing element indicating a direction corresponding to a changed state in state changes of a plurality of persons being a basis of the determination for an abnormal state. This drawing element indicating a direction is attached to a person group as the basis or each person of the person group. The output processing unit 16 previously stores the association of a changed state with direction information corresponding thereto. For example, in a case where a changed state is "crouching down", an abnormal state is more likely to be present above or below the person, and thus an "upward direction" and a "downward direction" are associated with the changed state of "crouching down". In addition, in a case where a state change is "running away", an abnormal state is more likely to be present in an opposite direction to the running away direction, and thus an "opposite direction to the running away direction" is associated with a changed state corresponding to "running away". The output processing unit 16 specifies the direction information corresponding to the changed state, using such association information, and selects a drawing element corresponding to this specified direction information. An example of the drawing element indicating a direction includes an arrow or the like.

Figure 9:
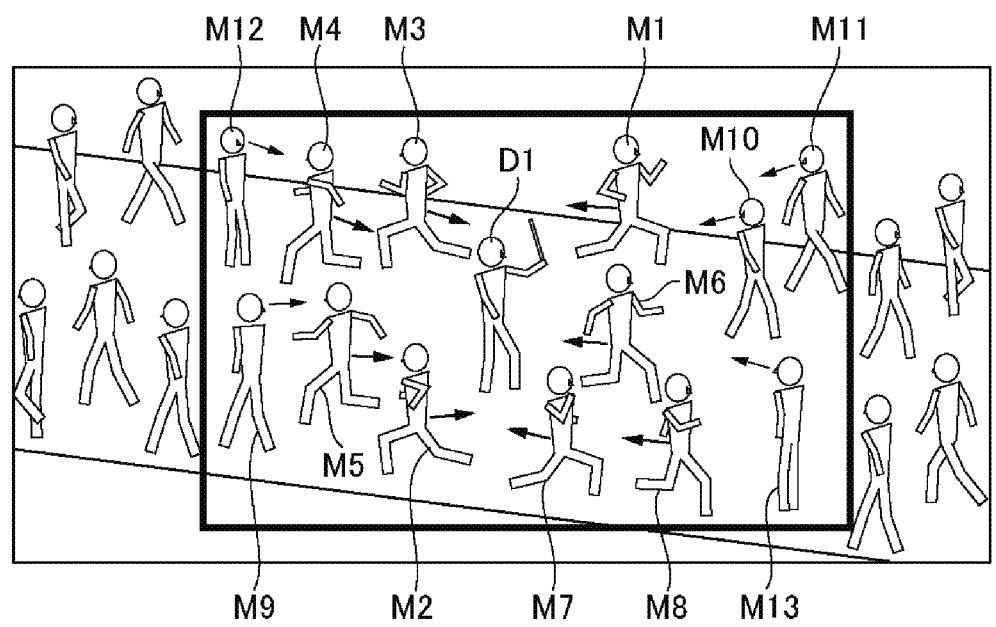
FIG. 9 is a diagram illustrating a fifth example of the output image of the output device.

FIG. 9 is a diagram illustrating a fifth example of an output image of the output device 6. In the example of FIG. 9, the output processing unit 16 causes the output device 6 to output an image in which a square-shaped drawing element is attached to a person group as the basis, and a drawing element indicating a direction corresponding to a changed state is attached to each person of the person group. An arrow (leftward direction in the drawing) pointing opposite to a "running away" direction (rightward direction in the drawing) is attached to the passersby M1, M6, M7 and M8, and an arrow (rightward direction in the drawing) pointing opposite to the "running away" direction (leftward direction in the drawing) is attached to the passersby M2 to M5. In addition, a leftward arrow as a "looking back" direction in the drawing is attached to the passersby M10 and M11, and a rightward arrow as the "looking back" direction in the drawing is attached to the passerby M9. In addition, leftward and rightward arrows are respectively attached to the passersby M12 and M13 as directions to which the faces are directed in a "stop" state in the drawing.

Output Example 5

The output processing unit 16 may also cause the output device 6 to output an image in which the input image is colored in a circular shape or an elliptical shape centering on a representative position of a person group as the basis on the input image, with a color corresponding to a distance from the representative position. In this case, the processing device 1 may have the following process configuration.

Figure 10:
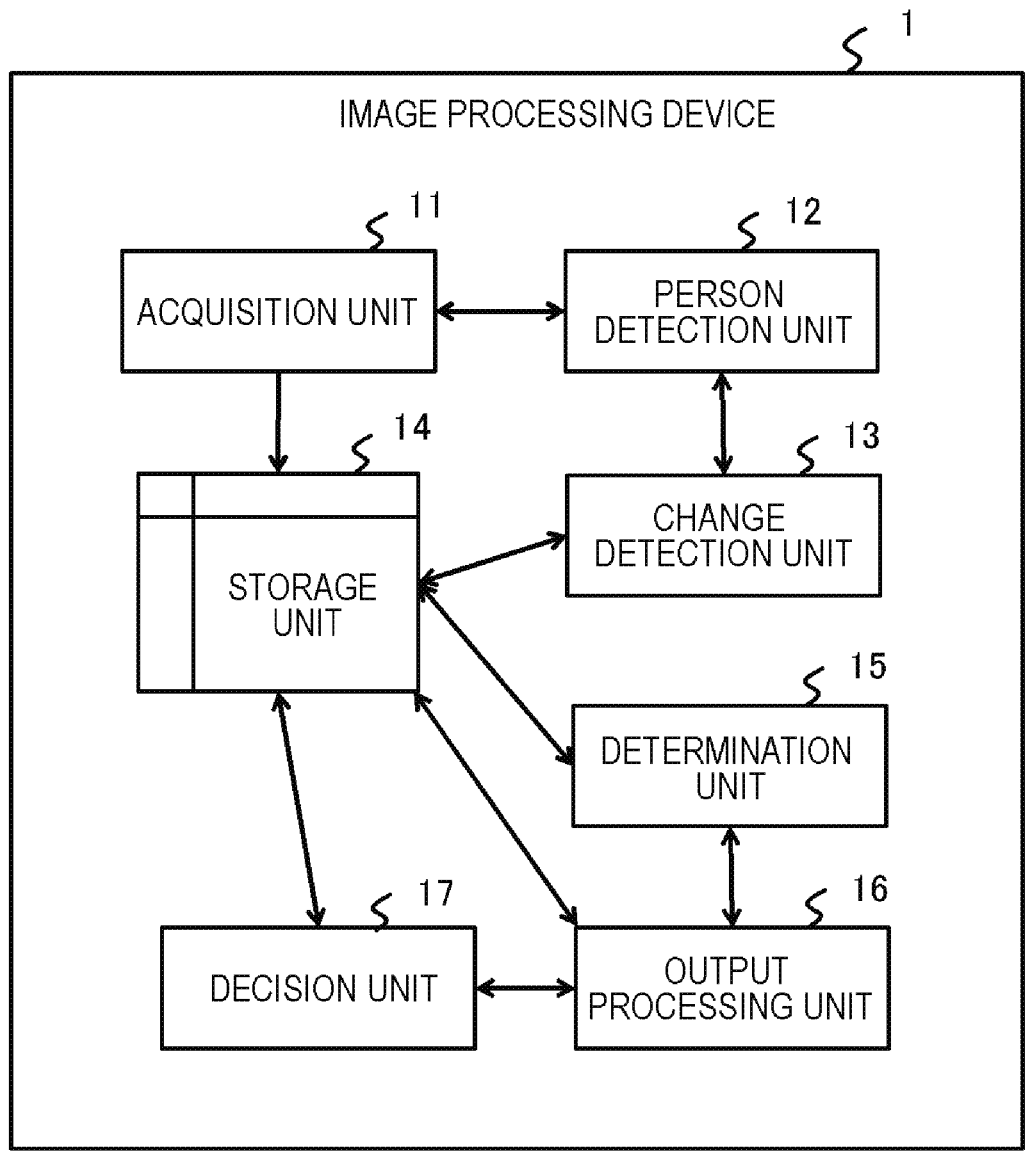
FIG. 10 is a diagram conceptually illustrating a process configuration example of an image processing device in a modification example of the first exemplary embodiment.

FIG. 10 is a diagram conceptually illustrating a process configuration example of an image processing device 1 in a modification example of the first exemplary embodiment. As shown in FIG. 10, the processing device 1 further includes a decision unit 17 in addition to the process configuration shown in FIG. 2. The decision unit 17 is also achieved similarly to other processing units.

The decision unit 17 decides the representative position of a person group on the input image, the detected state change of the person group being a basis of the determination for an abnormal state. The decision unit 17 may specify the position of each person of the person group as the basis, using the position information of the state change information stored in the storage unit 14, and decide the centroid position of the person group as a representative position, on the basis of the specified position. The representative position has only to indicate the representative position of the person group as the basis, and is not limited to the centroid position.

According to such an output example, since the representative position of the person group as the basis and a distance from the representative position are easier to be ascertained, it is possible to output an image which is useful to specifying a place of an abnormal state.

The output processing unit 16 may causes the output the image to continue over a period of time corresponding to the number of persons in a person group of which the detected state change is a basis of the determination for an abnormal state. As described above, as the number of persons who make the target state change becomes larger, there is a high possibility of an abnormal state being present in reality. Thus, as the number of persons in the person group as the basis becomes larger, the image is output longer, and thus a person who sees the image can easily take notice of the abnormal state.

Abnormality Detection Method/Operation Example

Figure 11:
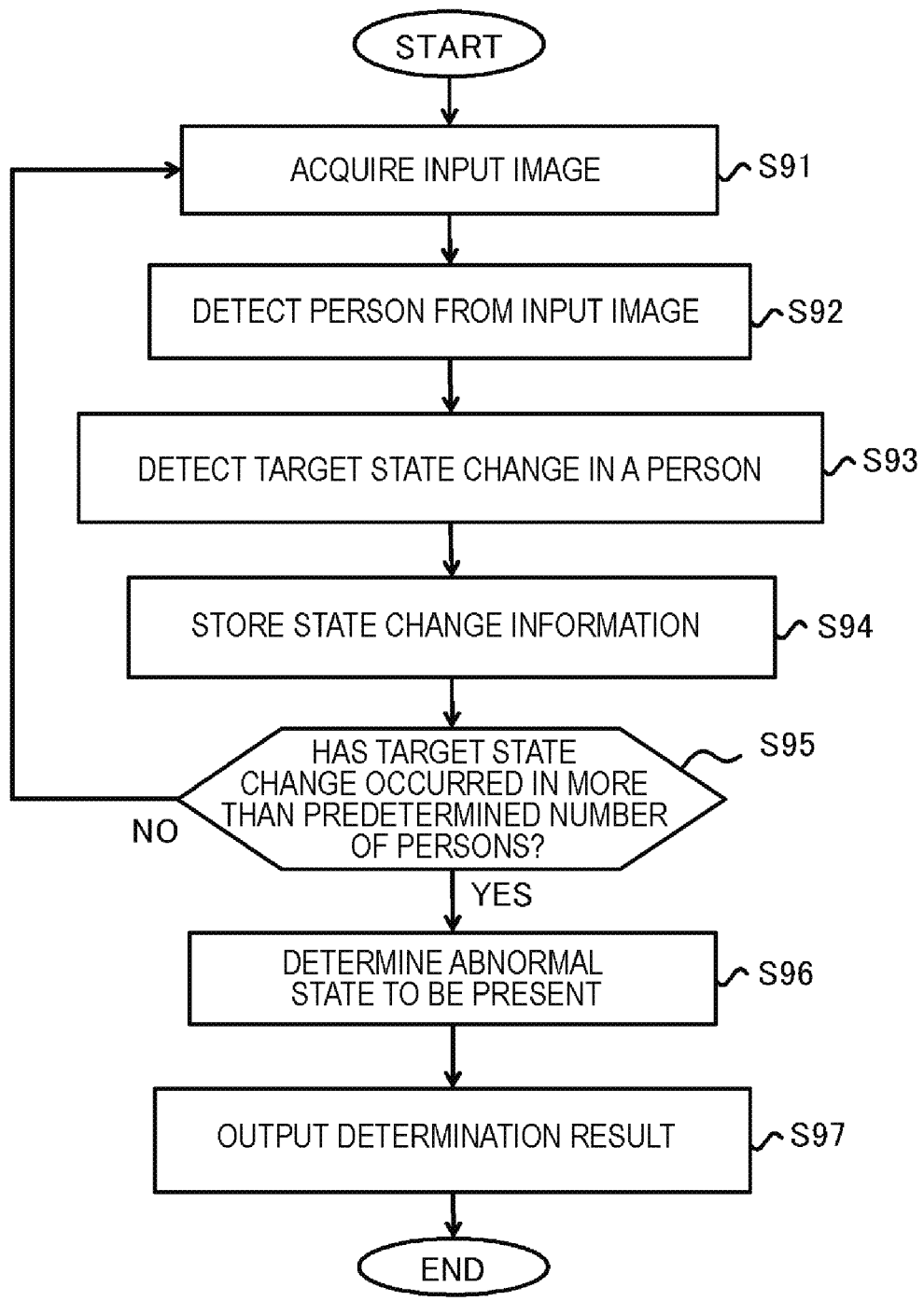
FIG. 11 is a flow diagram illustrating an operation example of the image processing device in the first exemplary embodiment.

Hereinafter, an abnormality detection method in the first exemplary embodiment will be described with reference to FIG. 11. FIG. 11 is a flow diagram illustrating an operation example of the processing device 1 in the first exemplary embodiment. As shown in FIG. 11, the abnormality detection method in the first exemplary embodiment is executed by at least one computer such as the processing device 1. For example, steps shown in the drawing are executed by processing units included in the processing device 1. Since each step is the same as the processing details of each of the aforementioned processing units included in the processing device 1, the details of each step will not be repeated.

The processing device 1 acquires an input image (S91). The input image is sequentially acquired by capturing a video signal from the monitoring camera 7 at any timing.

The processing device 1 detects a person from the acquired input image (S92). The processing device 1 may detect the person's entire body, and may detect a portion of the person.

The processing device 1 detects a target state change in the person detected in (S92), on the basis of the input image acquired in (S91) (S93). The target state change means a change in outer appearance of a person due to the occurrence of an abnormal state.

The processing device 1 stores information (state change information) for each target state change detected in (S93) (S94). The state change information includes information such as an occurrence time, a person ID, and the details of a state change. In addition, the state change information may include the position of a person indicated by the person ID on an image, in addition thereto. In addition, the state change information may include the position of a person on a real space.

The processing device 1 refers to the stored state change information, to determine whether the target state change has occurred in equal to or more than a predetermined number of persons (S95). In a case where occurrences of the target state change in equal to or more than a predetermined number of persons is detected (S95; YES), the processing device 1 determines an abnormal state to be present (S96). In this case, the processing device 1 may further use a deviation in the occurrence times of the target state change in equal to or more than a predetermined number of persons in order to determine an abnormal state. In this case, in a case where the target state change has occur in equal to or more than a predetermined number of persons within a predetermined time period, the processing device 1 determines an abnormal state to be present. This deviation in the occurrence times is used, and thus the processing device 1 may also infer the degree of an abnormal state.

The processing device 1 causes the output device 6 to output the determination result of an abnormal state (S97). The processing device 1 may cause the output device 6 to output the presence or absence of an abnormal state, and may also cause the output device to output the images shown in «Output Examples 1 to 5» described above, together with the presence or absence of an abnormal state or instead of the presence or absence of an abnormal state.

In FIG. 11, a plurality of steps (processes) are shown in order, but the order of steps executed in the abnormality detection method in the first exemplary embodiment is not limited to the example of FIG. 11. For example, (S94) is executed only in a case where the detection of both (S92) and (S93) has succeeded. In addition, (S91) may be executed in a predetermined cycle, regardless of the determination result of (S95).

Further conditions may be added to the condition (S95) of the determination of an abnormal state in FIG. 11, as shown in Methods 1 to 3 of «Other Methods for Determining Abnormal States». In a case where Method 1 of «Other Methods for Determining Abnormal States» is executed, in (S95), the processing device 1 determines whether the target state change has occurred in equal to or more than a predetermined number of persons within a predetermined time period. In a case where Method 2 of «Other Methods for Determining Abnormal States» is executed, in (S95), the processing device 1 determines whether the target state change resulting in the same changed state has occurred in equal to or more than a predetermined number of persons. In a case where Method 3 of «Other Methods for Determining Abnormal States» is executed, in (S95), the processing device 1 determines whether the target state change has occurred in equal to or more than a predetermined number of persons close in distance to each other. In addition, in (S95), the processing device 1 may determine a condition in which any plurality of these conditions are combined.

Operation and Effect in First Exemplary Embodiment

As described above, in the first exemplary embodiment, a target state change in a person is detected on the basis of an input image, and an abnormal state is determined to be present in a case where the target state change occurs in equal to or more than a predetermined number of persons. In a case where the abnormal state of a person such as the suspicious state of a person, the abnormal state of an object such as a neglected object or foul matter, or the abnormal state of a place where a fire, an accident or the like occurs, and a person is present in the periphery of the place of occurrence, each person makes a change in outer appearance such as posture, behavior, or facial expression which is not made in the monitored place at a normal time. Consequently, in the first exemplary embodiment, various abnormal states in a person, an object, a place or the like are captured due to state changes of persons located in the vicinity thereof.

Therefore, according to first exemplary embodiment, it is possible to comprehensively detect various abnormal states of a person, an object, a place or the like. Further, according to the first exemplary embodiment, insofar as state changes of persons located in the vicinity of the abnormal state, it is possible to detect an abnormal state even in a case where the abnormal state itself does not appear in an input image. For example, even in a case where an abnormal state is present beyond the image capture range of the monitoring camera 7, or a case where an abnormal state is hidden by an obstacle, according to the first exemplary embodiment, it is possible to detect the abnormal state. Further, according to the first exemplary embodiment, in the output image, some kind of drawing element is attached to a person group being a basis of the determination for an abnormal state or each person of the person group, and thus it is possible to enable a person who sees an image to infer a position where an abnormal state is present.

Second Exemplary Embodiment

A processing device 1 in the second exemplary embodiment controls the monitoring camera 7 using the determination result of an abnormal state. Hereinafter, the processing device 1 in the second exemplary embodiment will be described with a focus on details different from those in the first exemplary embodiment. In the following description, the same details as those in the first exemplary embodiment will not be repeated.

Figure 12:
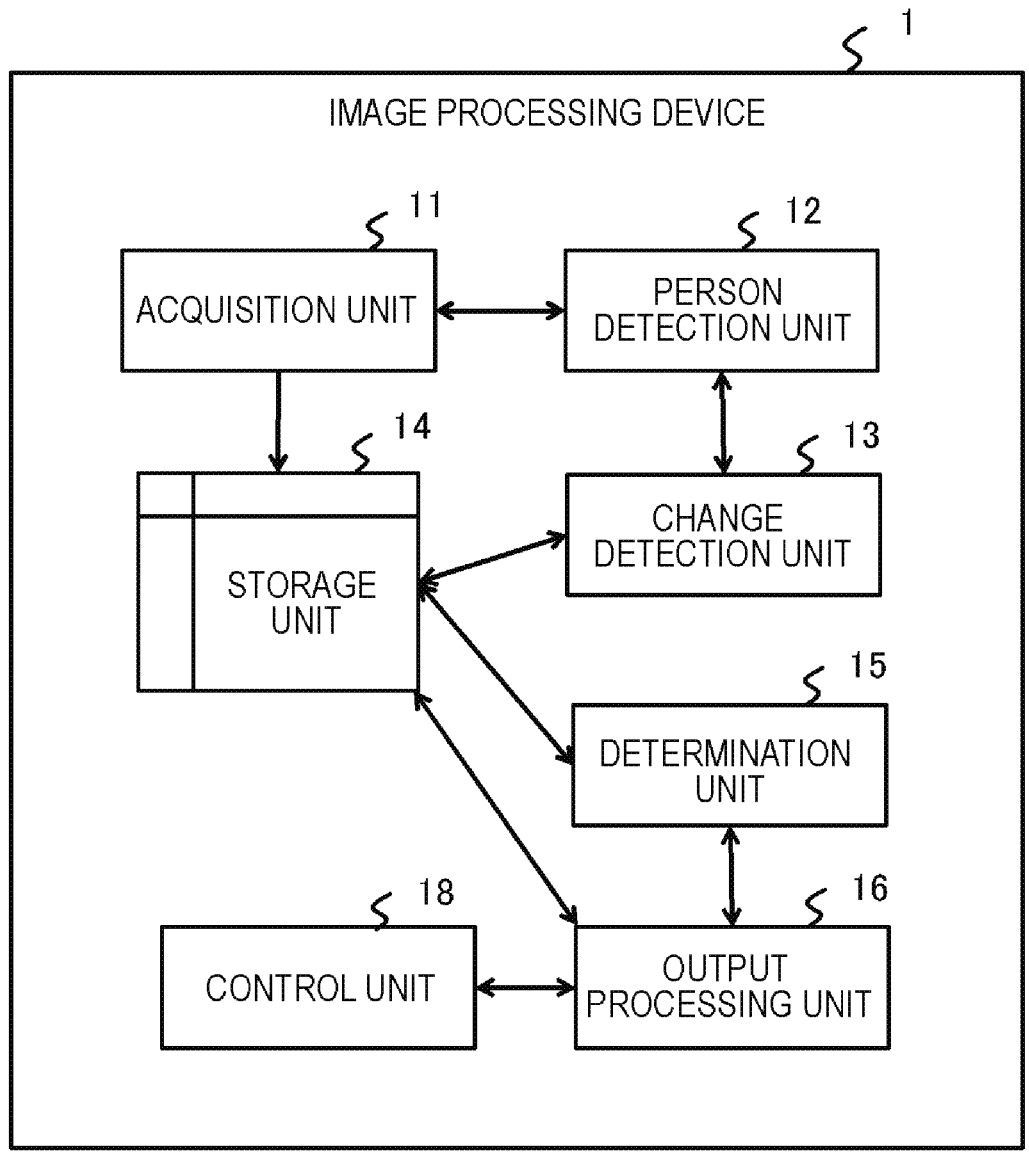
FIG. 12 is a diagram conceptually illustrating a process configuration example of an image processing device in a second exemplary embodiment.

FIG. 12 is a diagram conceptually illustrating a process configuration example of the image processing device 1 in the second exemplary embodiment. As shown in FIG. 12, the processing device 1 further includes a control unit 18 in addition to the process configuration in the first exemplary embodiment. The control unit 18 is also achieved similarly to other processing units. The control unit 18 controls the monitoring camera 7 using the state change information or the like which is stored in the storage unit 14. Hereinafter, a specific example of a method of controlling the monitoring camera 7 by the control unit 18 will be described.

«Camera Control Method 1»

The control unit 18 may control the imaging direction of the monitoring camera 7 on the basis of the representative position of a person group of which the detected state change is a basis of the determination for an abnormal state on the input image. In this case, as shown in FIG. 10, the processing device 1 further includes the decision unit 17. As described above, the decision unit 17 decides the representative position of a person group of which the detected state change is a basis of the determination for an abnormal state on the input image on the input image.

In this case, the monitoring camera 7 includes a mechanism (not shown) that adjusts an imaging direction. This mechanism may change the direction of the monitoring camera 7, and may change the imaging direction using a movable mirror or an optical system. The control unit 18 instructs the monitoring camera 7 or the mechanism to change the imaging direction through the communication unit 4. Specifically, the control unit 18 gives an instruction to change the imaging direction so that the representative position of a person group as the basis is located in the center of the input image. The imaging direction of the monitoring camera 7 is adjusted in accordance with this instruction.

According to such a method, since the representative position of a person group being a basis of the determination for an abnormal state is located in the center of the input image, the representative position of a person group as the basis and the vicinity thereof are easier to be observed by a person who sees the image. Thereby, since there is a high possibility of an abnormal state being present at the position of a person group as the basis and in the vicinity thereof, the place of the abnormal state can be easily inferred.

«Camera Control Method 2»

The control unit 18 may control the angle of view of the monitoring camera 7 on the basis of the size of a person group on the input image of which the detected state change is a basis of the determination for an abnormal state. For example, the control unit 18 sends an instruction to change the angle of view of the monitoring camera 7 to the monitoring camera 7 so that a person group as the basis falls within a portion of a predetermined range in the input image and the vicinity of the person group appears in the input image. The monitoring camera 7 zooms in or zooms out in accordance with this instruction. The size of a person group on an input image may be determined, for example, by bringing the image regions of persons detected by the person detection unit 12 together. The control unit 18 may continue to send an instruction to zoom in or zoom out to the monitoring camera 7 until the size of the person group falls within the predetermined range.

According to such a method, since the angle of view of the monitoring camera 7 is changed so that a person group being a basis of the determination for an abnormal state falls within a portion of a predetermined range in the input image, a person group as the basis and the vicinity thereof is easier to be observed by a person who sees the image. Thereby, since there is a high possibility of an abnormal state being present at the position of the person group as the basis and in the vicinity thereof, the place of the abnormal state can be easily inferred.

«Camera Control Method 3»

The control unit 18 may continuously change the imaging direction of the monitoring camera 7 in a range in which the entirety or a portion of a person group of which the detected state change is a basis of the determination for an abnormal state is included in the input image. Specifically, the control unit 18 identifies the position of a person group as the basis on the input image on the basis of the state change information which is stored in the storage unit 14. The control unit 18 may calculate the change range of the imaging direction corresponding to a range in which at least a portion of the person group falls within the input image, on the basis of the recognized position. The control unit 18 continuously sends an instruction to change the imaging direction to a mechanism that adjusts the monitoring camera 7 or the imaging direction so that the position of the person group on the input image is changed within this change range. The control unit 18 includes, for example, a direction (vertical direction, horizontal direction, or the like) to be changed and an angle to be changed, in the instruction to change the imaging direction.

According to such a method, it is possible to comprehensively ascertain a situation around a person group as the basis. An abnormal state which does not appear in the input image during the determination of the abnormal state to be present may be included in the image capture range of the monitoring camera 7.

«Camera Control Method 4»

The control unit 18 may also change the imaging direction of the monitoring camera 7 in a direction corresponding to a changed state of a state change of a plurality of persons being a basis of the determination for an abnormal state. A method of acquiring a direction corresponding to a changed state and information of the direction is as described in «Output Example 4». The control unit 18 acquires direction information corresponding to a changed state, and sends an instruction to change the imaging direction including the direction information to a mechanism that adjusts the monitoring camera 7 or the imaging direction.

According to such a method, since the imaging direction of the monitoring camera 7 can be turned toward a direction in which an abnormal state inferred from a changed state of a target state change is present, it is possible to intensively observe a place having a high possibility of the abnormal state being present. An abnormal state which does not appear in the input image during the determination of the abnormal state to be present may be able to be included in the image capture range of the monitoring camera 7.

The output processing unit 16 may continue to control the monitoring camera 7 over a period of time corresponding to the number of persons in a person group of which the detected state change is a basis of the determination for an abnormal state. As described above, as the number of persons who make the target state change becomes larger, there is a high possibility of an abnormal state being present in reality. Thus, as the number of persons in the person group as the basis becomes larger, the control of the monitoring camera 7 as described above is continued for a longer period of time. For example, the monitoring camera 7 is controlled so that the imaging direction changed on the basis of the representative position of a person group as the basis or a changed state is maintained for a long period of time. In addition, the monitoring camera 7 is controlled so that the angle of view changed on the basis of the size of a person group as the basis on an input image is maintained for a long period of time. In addition, a continuous change in the imaging direction of the monitoring camera 7 based on the position of a person group as the basis is continued for a long period of time. Thereby, a person who sees an image can easily take notice of the abnormal state.

Abnormality Detection Method: Operation Example

Figure 13:
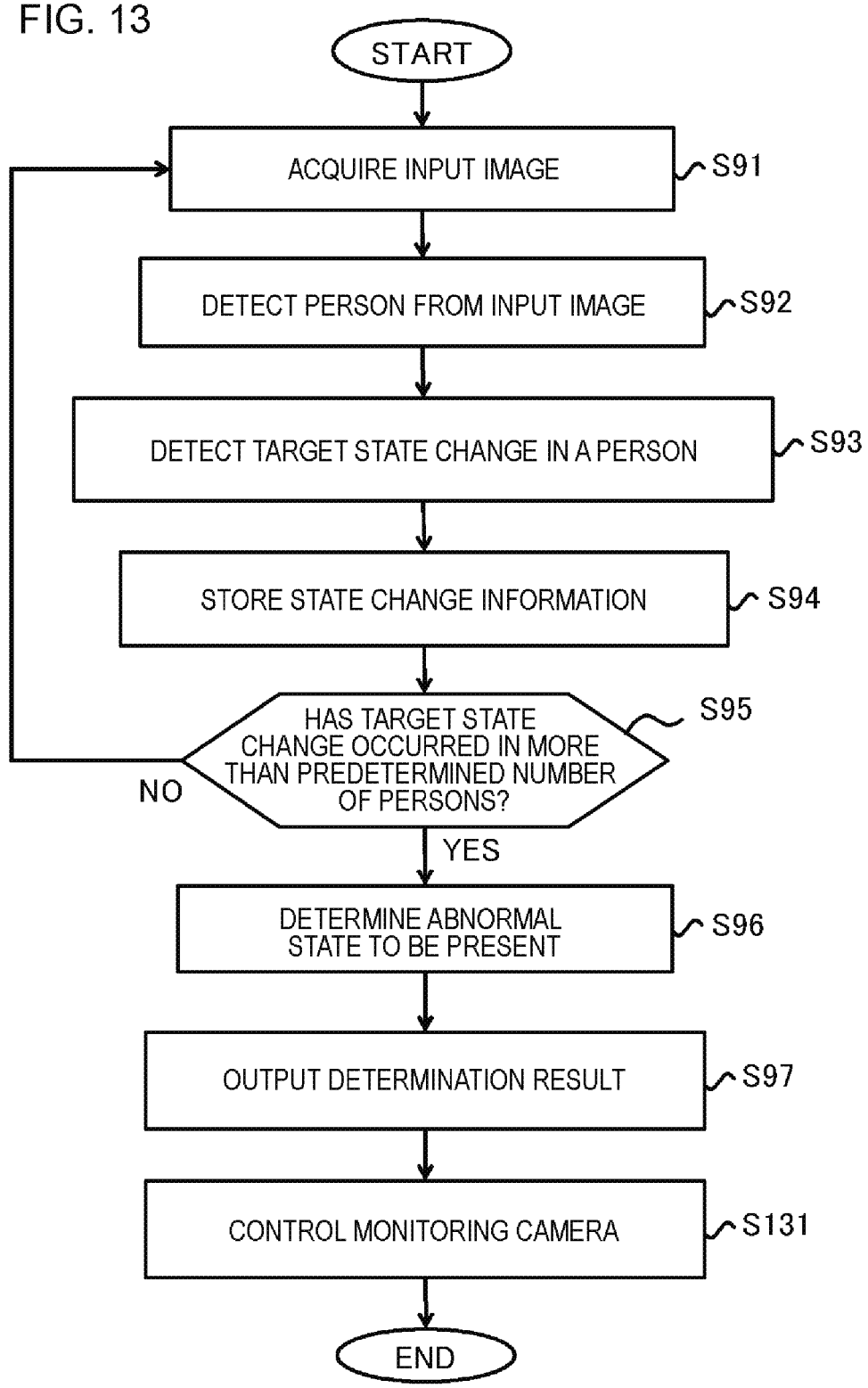
FIG. 13 is a flow diagram illustrating an operation example of the image processing device in the second exemplary embodiment.

Hereinafter, an abnormality detection method in the second exemplary embodiment will be described with reference to FIG. 13. FIG. 13 is a flow diagram illustrating an operation example of the processing device 1 in the second exemplary embodiment. In FIG. 13, steps having the same processing details as those of FIG. 11 are denoted by the same reference numerals and signs as those of FIG. 11. The subject by which the abnormality detection method in the second exemplary embodiment is executed is the same as that in the first exemplary embodiment.

In the abnormality detection method in the second exemplary embodiment, (S131) is further executed with respect to the method in the first exemplary embodiment. In (S131), the processing device 1 controls the monitoring camera 7 using the state change information or the like which is stored in the storage unit 14. A specific control method is as described above.

Operation and Effect in Second Exemplary Embodiment

As described above, in the second exemplary embodiment, in a case where an abnormal state is determined to be present, the imaging direction or the angle of view of the monitoring camera 7 is controlled on the basis of the position of a person group as the basis, a changed state of each person of the person group, or the like. As a result, since a situation around a person group as the basis having a high possibility of an abnormal state being present can be visually recognized, the abnormal state can be easily observed.

Modification Example of Second Exemplary Embodiment

The processing device 1 is connected to a plurality of monitoring cameras 7, and may also control the plurality of monitoring cameras 7. In this modification example, each of the monitoring cameras 7 is installed so that a different monitored place is set to be in an image capture range. In this modification example, in a case where an abnormal state is detected on the basis of an input image captured by a certain monitoring camera 7, the processing device 1 may select another monitoring camera 7 corresponding to the position of a person group being a basis of the determination for an abnormal state, and change the imaging direction and the angle of view of the monitoring camera 7. With such a configuration, in a case even if the imaging direction or the angle of view of one monitoring camera 7 is changed as described above, an abnormal state is present at a position which does not appear in the monitoring camera 7, another monitoring camera 7 located in the vicinity thereof is controlled, and thus it is possible to capture an image of the position.

A plurality of processing devices 1 which are each connected to at least one monitoring camera 7 may cooperate with each other. In this case, in a case where a certain processing device 1 detects an abnormal state, the processing device 1 provides abnormal state determination results to another processing device 1 located in the vicinity thereof. The processing device 1 having received the results changes the imaging direction or the angle of view of its own monitoring camera 7 so as to capture an image of the periphery of a monitored place by the monitoring camera 7 of the processing device 1 serving as its source. In this case, the processing device 1 may also provide information relating to the position of a person group as the basis to another processing device 1, in addition to the abnormal state determination results.

Modification Example of Each Exemplary Embodiment

Without the monitoring camera 7 being connected to the processing device 1, the processing device 1 may use the monitoring camera 7 which is connected to another computer. In this case, the acquisition unit 11 may acquire an input image or a video signal from a portable recording medium or another computer through the communication unit 4. Examples of the another computer may include an image storage and distribution device that temporarily stores and distributes an image captured by a camera, an image recorder that accumulates and reproduces an image, and the like. In this case, the output processing unit 16 may output the image to another computer through the communication unit 4. In addition, the control unit 18 transmits instruction information for controlling the monitoring camera 7 to the another computer.

Third Exemplary Embodiment

Hereinafter, an image processing device and an abnormality detection method in a third exemplary embodiment will be described with reference to FIGS. 14 and 15.

Figure 14:
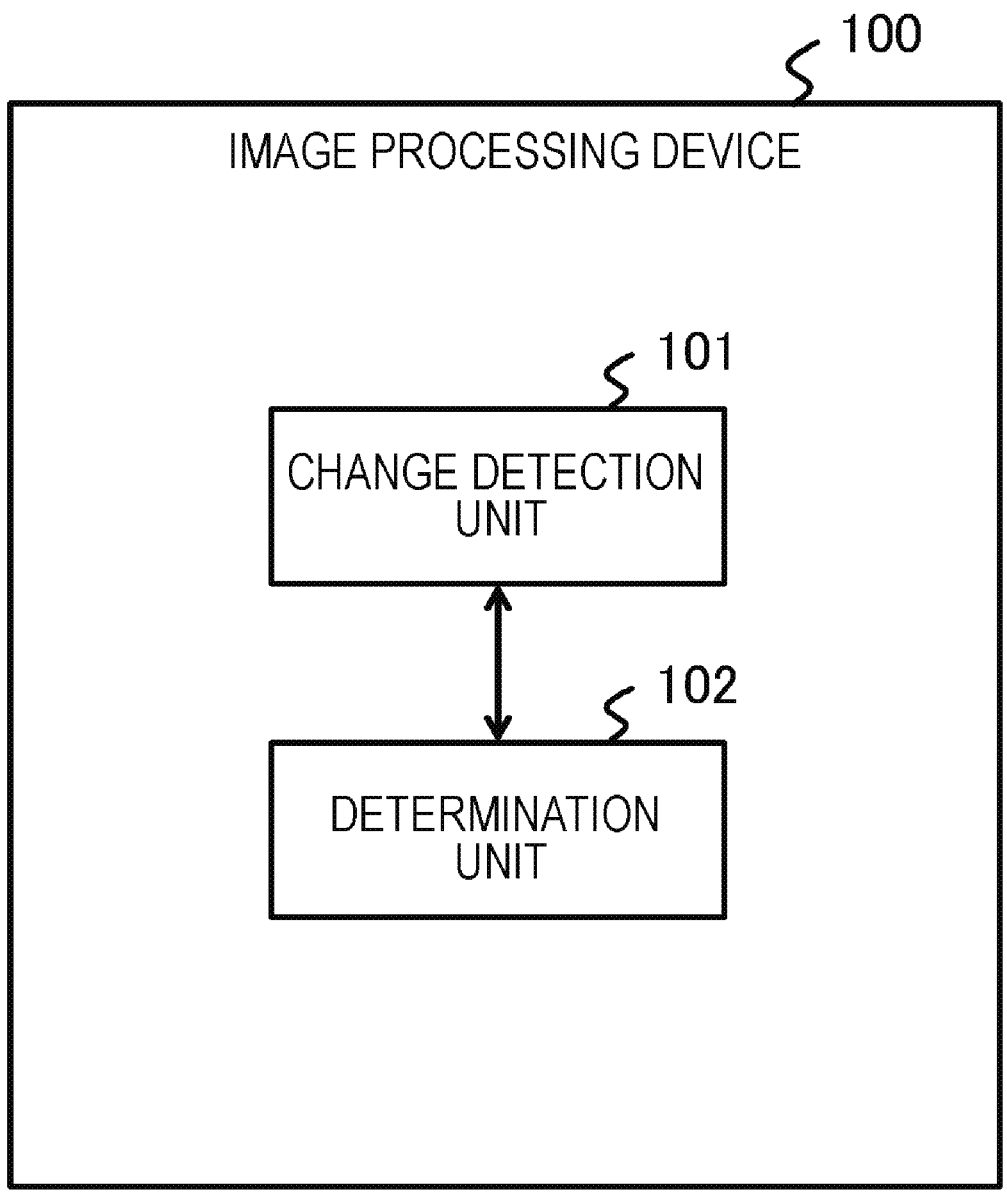
FIG. 14 is a diagram conceptually illustrating a process configuration example of an image processing device in a third exemplary embodiment.

FIG. 14 is a diagram conceptually illustrating a process configuration example of an image processing device in the third exemplary embodiment. As shown in FIG. 14, an image processing device 100 includes a change detection unit 101 and a determination unit 102. The image processing device 100 has, for example, the same hardware configuration as that of the aforementioned processing device 1 shown in FIG. 2, and is configured such that each of the aforementioned processing units is achieved by a program being processed similarly to the processing device 1. However, the image processing device 100 may not be connected to the output device 6 and the monitoring camera 7.

The change detection unit 101 detects a target state change in a person on the basis of an input image. The specific processing details of the change detection unit 101 are the same as those of the aforementioned change detection unit 13. In the third exemplary embodiment, the change detection unit 101 may also acquire information relating to an image region of a person on each input image from the acquisition unit 11 and the person detection unit 12 which are achieved in another computer, and detect a target state change in a person using this information. In this manner, the image processing device 100 in the third exemplary embodiment does not necessarily require the acquisition unit 11 and the person detection unit 12. In addition, the change detection unit 101 may cause another computer to store information relating to the detected target state change.

The determination unit 102 detects occurrences of a target state change in a plurality of persons, and determines an abnormal state in accordance with this detection. The specific processing contents of the determination unit 102 are the same as those of the aforementioned determination unit 15. In a case where the image processing device 100 does not include the storage unit 14, the determination unit 102 may acquire the state change information from the storage unit 14 on another computer to use for the determination of an abnormal state. In addition, the determination unit 102 may notify another computer of the determination results.

Figure 15:
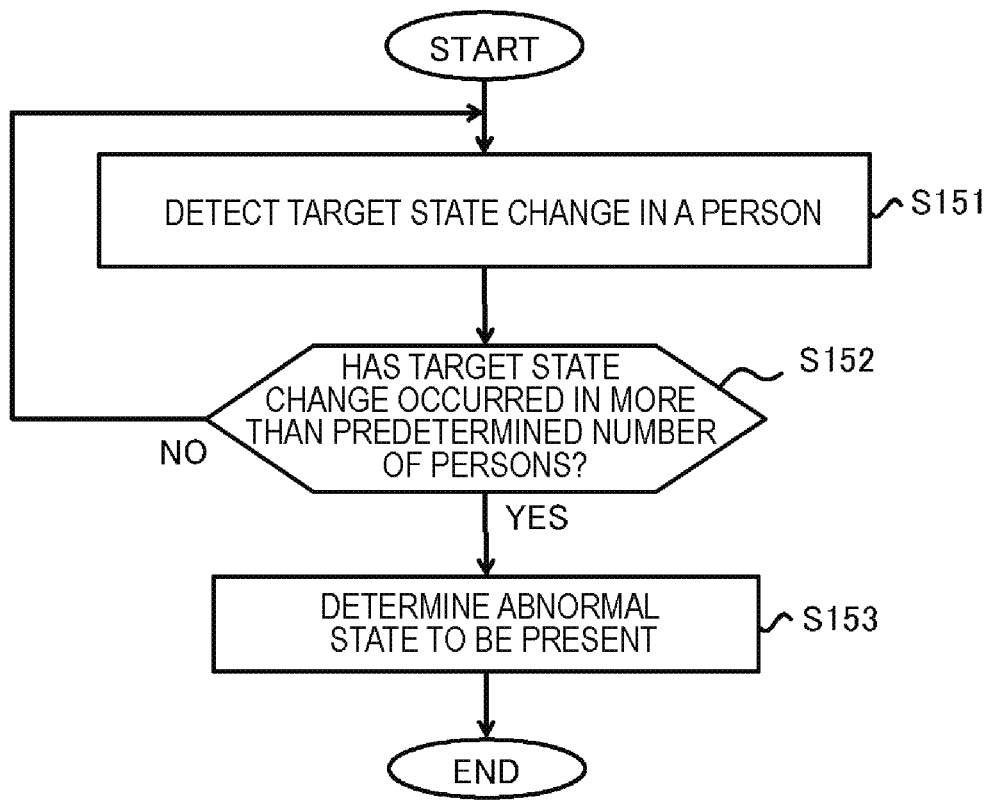
FIG. 15 is a flow diagram illustrating an operation example of the image processing device in the third exemplary embodiment.

FIG. 15 is a flow diagram illustrating an operation example of the image processing device 100 in the third exemplary embodiment. As shown in FIG. 15, the abnormality detection method in the third exemplary embodiment is executed by at least one computer such as the image processing device 100. For example, each step which is shown in the drawing is executed by each processing unit included in the image processing device 100.

The abnormality detection method in the third exemplary embodiment includes detecting a target state change in a person on the basis of an input image (S151), and, in a case where occurrences of the target state change occur in a plurality of persons is detected (S152; YES), determining an abnormal state (S153). Step (S151) is equivalent to (S93) of FIGS. 11 and 13, step (S152) is equivalent to (S95) of FIGS. 11 and 13, and step (S153) is equivalent to (S96) of FIGS. 11 and 13.

In addition, the third exemplary embodiment may be a program causing at least one computer to execute such an abnormality detection method, and may be a recording medium having such a program recorded thereon and readable by the at least one computer.

According to the third exemplary embodiment, it is possible to obtain the same operational effects as those in the aforementioned first exemplary embodiment and second exemplary embodiment.

Meanwhile, in a plurality of flow diagrams using the aforementioned description, a plurality of steps (processes) are described in order, but the order of steps executed in each of the exemplary embodiments is not restricted to the described order. In each of the exemplary embodiments, the order of steps shown may be changed within the range without any problem in terms of contents. In addition, each of the exemplary embodiments and each of the modification examples described above may be combined in the range consistent with the contents thereof.

Some or all of the respective exemplary embodiments and the respective modification examples described above may be specified as follows. However, the respective exemplary embodiments and the respective modification examples are not limited to the following descriptions.

Disclosed is an image processing device including: a change detection unit that detects a target state change in a person on the basis of an input image; and a determination unit that determines an abnormal state in accordance with a detection obtained by detecting occurrences of the target state change in a plurality of persons. The determination unit detects the changed states which have occurred in a plurality of persons to be the same target state change. The determination unit also detects occurrences of the target state change in a plurality of persons close in distance to each other. The determination unit further uses a deviation in occurrence times of the target state change in the plurality of persons in order to determine an abnormal state. The determination unit infers a degree of an abnormal state in accordance with the deviation in the occurrence times of the target state change in the plurality of persons. The image processing device further includes an output processing unit that causes an output device to output an image in which a drawing element is attached to a person group or to each person of the person group in the input image, the detected state change of the person group or said each person of the person group being a basis of the determination for an abnormal state. The output processing unit causes the output device to output the image in which any one or both of the number of persons in the person group and a relative distance between each person of the person group are further attached to the person group in the input image, the detected state change of the person group being a basis of the determination for an abnormal state. The output processing unit also causes the output device to output the image in which an order of state changes or a time difference between state changes is attached to each person of the person group of which the detected state change is a basis of the determination for an abnormal state, as the drawing element or together with the drawing element. The output processing unit further causes the output device to output the image attached with the drawing element indicating a direction corresponding to changed states in state changes in a plurality of persons being a basis of the determination for an abnormal state. The image processing device further includes: a decision unit that decides a representative position of the person group on the input image, the detected state change of the person group being a basis of the determination for an abnormal state; and an output processing unit that causes the output device to output an image in which the input image is colored with a color corresponding to a distance from the representative position, in a circular shape or an elliptical shape centering on the representative position. The output processing unit causes the output of the image to continue over a period of time corresponding to the number of persons in a person group of which the detected state change is a basis of the determination for an abnormal state. The image processing device further includes: a decision unit that decides a representative position of a person group on the input image, the detected state change of the person group being a basis of the determination for an abnormal state; and a control unit that controls an imaging direction of an imaging device, on the basis of the representative position. The image processing device further includes a control unit that controls an angle of view of an imaging device, on the basis of a size of a person group on the input image, the detected state change of the person group being a basis of the determination for an abnormal state. The image processing device further includes a control unit that continuously changes an imaging direction of an imaging device in a range in which an entirety or a portion of a person group is included in the input image, the detected state change of the person group being a basis of the determination for an abnormal state. The image processing device further includes a control unit that changes an imaging direction of an imaging device to a direction corresponding to a changed state in a state change of a plurality of persons being a basis of the determination for an abnormal state. The control unit continues to control the imaging device, over a period of time corresponding to the number of persons in the person group of which the detected state change is a basis of the determination for an abnormal state.

Disclosed is an abnormality detection method which is executed by at least one computer, the method including: detecting a target state change in a person on the basis of an input image; detecting occurrences of the target state change in a plurality of persons; and determining an abnormal state in accordance with the detection. Detecting occurrences of the target state change in a plurality of persons includes detecting the changed states which have occurred in a plurality of persons to be the same target state change. Detecting occurrences of the target state change in a plurality of persons includes detecting occurrences of the target state change in a plurality of persons close in distance to each other. Detecting occurrences of the target state change in a plurality of persons includes further detecting a deviation in occurrence times of the target state change in the plurality of persons being within a predetermined time period. The abnormality detection method further includes inferring a degree of an abnormal state in accordance with the deviation in the occurrence times of the target state change in the plurality of persons. The abnormality detection method also includes causing an output device to output an image in which a drawing element is attached to a person group or to each person of the person group in the input image, the detected state change of the person group or said each person of the person group being a basis of the determination for an abnormal state. The method includes causing the output device to output the image in which any one or both of the number of persons in the person group and a relative distance between each person of the person group are further attached to the person group in the input image, the detected state change of the person group being a basis of the determination for an abnormal state. The method also includes causing the output device to output the image in which an order of state changes or a time difference between state changes is attached to each person of the person group of which the detected state change is a basis of the determination for an abnormal state, as the drawing element or together with the drawing element. The method further includes causing the output device to output the image in which the drawing element is attached indicating a direction corresponding to a changed state in a state change in a plurality of persons being a basis of the determination for an abnormal state. The method further includes: deciding a representative position of the person group on the input image, the detected state change of the person group being a basis of the determination for an abnormal state; and the abnormality detection method further includes causing the output device to output an image in which the input image is colored with a color corresponding to a distance from the representative position, in a circular shape or an elliptical shape centering on the representative position. The abnormality detection method further includes causing the output the image to continue over a period of time corresponding to the number of persons in a person group of which the detected state change is a basis of the determination for an abnormal state. The abnormality detection method further includes: deciding a representative position of the person group on the input image, the detected state change of the person group being a basis of the determination for an abnormal state; and controlling an imaging direction of an imaging device, on the basis of the representative position. The abnormality detection method further includes controlling an angle of view of an imaging device, on the basis of a size of a person group on the input image of which the detected state change is a basis of the determination for an abnormal state. The abnormality detection method further includes continuously changing an imaging direction of an imaging device in a range in which an entirety or a portion of a person group is included in the input image, the detected state change of the person group being a basis of the determination for an abnormal state. The abnormality detection method further includes changing an imaging direction of an imaging device to a direction corresponding to a changed state of a state change of a plurality of persons being a basis of the determination for an abnormal state. The abnormality detection method further includes continuing to control the imaging device, over a period of time corresponding to the number of persons in the person group of which the detected state change is a basis of the determination for an abnormal state.

Disclosed is a program causing a computer to execute the abnormality detection methods described above. A recording medium has the program recorded thereon so as to be readable by a computer.

This application claims priority from Japanese Patent Application No. 2014-132304 filed on Jun. 27, 2014 the content of which is incorporated herein by reference in its entirety.

The invention claimed is:

1. An image processing device comprising:
a memory for storing instructions; and
a processor that executes the stored instructions to perform a method, the method comprising:
detecting whether an input image includes one or more persons in a predetermined state, the predetermined state being indicative of a predetermined changed state of a person corresponding to a type of an abnormal state; and
determining an occurrence of the abnormal state when a plurality of persons in the predetermined state are detected in the input image,
wherein the determining further comprises:
counting a number of the plurality of persons who are detected in the input image and who have a relative distance of within a predetermined distance from each other; and
determining whether the counted number of the plurality of persons is equal to or more than a predetermined number.

2. The image processing device according to claim 1, wherein the predetermined state is a predetermined expression of an emotion of a person, the predetermined expression being caused by the occurrence of the abnormal state.

3. The image processing device according to claim 1, wherein the determining further comprises determining whether a number of the plurality of persons in the predetermined state is equal to or more than a predetermined number.

4. The image processing device according to claim 1, wherein the determining further comprises:
calculating a duration in which the persons are detected;
determining that the abnormal state occurs when the duration is within a predetermined duration; and
inferring a higher degree of the abnormal state as the duration is smaller.

5. The image processing device according to claim 1, wherein the method further comprises causing an output device to output an image in which a drawing element is attached to a person group or to each person of the person group among persons included in the input image, the person group being a basis of the determination for the abnormal state.

6. The image processing device according to claim 5, wherein the causing the output device to output the image further comprises causing the output device to output the image in which a relative distance between each person of the person group is further attached to the person group among the persons included in the input image, the person group being a basis of the determination for the abnormal state.

7. The image processing device according to claim 5, wherein the causing the output device to output the image further comprises causing the output device to output the image in which each person of the person group which is a basis of the determination for the abnormal state is attached an order of a time when a person in the image is detected as being in the predetermined state or a time difference between times of the detection, as the drawing element or together with the drawing element, the times of the order in time or the time difference between times being indicative of times at which the plurality of persons are detected as in the predetermined state.

8. The image processing device according to claim 5, wherein the causing the output device to output the image further comprises causing the output device to output the image attached with the drawing element indicating a predetermined direction previously associated with the predetermined state in a plurality of persons being a basis of the determination for the abnormal state.

9. The image processing device according to claim 1, wherein the method further comprises:
deciding a representative position of the person group on the input image, the person group being a basis of the determination for the abnormal state; and
causing the output device to output an image in which the input image is colored with a color in a predetermined shape centering on the representative position.

10. The image processing device according to claim 5, wherein causing the output device to output the image further comprises causing the output device to continue to display the image on a screen over a period of time corresponding to the number of persons in a person group which is a basis of the determination for the abnormal state.

11. The image processing device according to claim 1, wherein the method further comprises:
deciding a representative position of a person group on the input image, the person group being a basis of the determination for the abnormal state; and
controlling an imaging direction of an imaging device, on the basis of the representative position,
wherein the controlling further comprises continuing to control the imaging device over a period of time corresponding to the number of persons in a person group which is a basis of the determination for the abnormal state.

12. The image processing device according to claim 1, wherein the method further comprises controlling an angle of view of an imaging device so that a person group falls within a portion of a predetermined range in the input image and a vicinity of the person group is included in the input image, the person group being a basis of the determination for the abnormal state.

13. The image processing device according to claim 1, wherein the method further comprises:
calculating a change range of an imaging direction of an imaging device corresponding to a range of the input image in which an entirety or a portion of a person group is included, the person group being a basis of the determination for the abnormal state; and
continuously changing the imaging direction of the imaging device within the calculated change range.

14. The image processing device according to claim 1, wherein the method further comprises changing an imaging direction of an imaging device to a direction previously associated with the predetermined state of a plurality of persons being a basis of the determination for the abnormal state.

15. The image processing device according to claim 12, wherein the controlling the imaging direction of the imaging device further comprises continuously controlling the imaging device, over a period of time corresponding to the number of persons in the person group which is a basis of the determination for the abnormal state.

16. An abnormality detection method which is executed by at least one computer, the method comprising:
detecting whether an input image includes one or more persons in a predetermined state, the predetermined state being indicative of a predetermined changed state of a person corresponding to a type of an abnormal state; and determining an occurrence of the abnormal state when a plurality of persons in the predetermined state are detected in the input image, wherein the determining further comprises:

counting a number of the plurality of persons who are detected in the input image and who have a relative distance of within a predetermined distance from each other; and determining whether the counted number of the plurality of persons is equal to or more than a predetermined number.

17. A non-transitory computer readable storage medium storing a program causing a computer to execute an abnormality detection method, the method comprising:

detecting whether an input image includes one or more persons in a predetermined state, the predetermined state being indicative of a predetermined changed state of a person corresponding to a type of an abnormal state; and determining an occurrence of the abnormal state when a plurality of persons in the predetermined state are detected in the input image, wherein the determining further comprises:

counting a number of the plurality of persons who are detected in the input image and who have a relative distance of within a predetermined distance from each other; and determining whether the counted number of the plurality of persons is equal to or more than a predetermined number.

18. The image processing device according to claim 1, wherein the detecting further comprises detecting the plurality of persons from a single input image.

19. The image processing device according to claim 13, wherein the controlling further comprises continuously controlling the imaging device over a period of time corresponding to the number of persons in a person group, the person group being a basis of the determination for the abnormal state.

20. The image processing device according to claim 14, wherein the controlling further comprises continuously controlling the imaging device over a period of time corresponding to the number of persons in a person group, the person group being a basis of the determination for the abnormal state.

\* \* \* \* \*